United States Patent [19]

Eros

[11] Patent Number: 5,030,044
[45] Date of Patent: Jul. 9, 1991

[54] COLLET KEY STABILIZER APPARATUS

[76] Inventor: Joseph Eros, R.D #1, Box 2A, Lewistown, Pa. 17044

[21] Appl. No.: 555,184

[22] Filed: Jul. 20, 1990

[51] Int. Cl.⁵ .............................................. B23B 39/00
[52] U.S. Cl. ................................... 408/241 R; 81/16; 279/1 K
[58] Field of Search ................... 408/241 R; 279/1 K; 81/16

[56] References Cited

U.S. PATENT DOCUMENTS

| | | | |
|---|---|---|---|
| 4,068,978 | 1/1978 | Brock | 408/241 R |
| 4,123,195 | 10/1978 | Purviance | 408/241 R |
| 4,615,653 | 10/1986 | Watson | 408/241 R |

FOREIGN PATENT DOCUMENTS 2628995  9/1989  France ................................ 279/1 K Primary Examiner—William Briggs
Attorney, Agent, or Firm—Leon Gilden

[57] ABSTRACT

Apparatus is provided for surrounding engagement with an associated truck collet to accommodate a plurality of collet sizes wherein a central H-shaped yoke pivotally mounts a first and second leg downwardly therefrom wherein each leg includes an inner and outer edge where the inner edge includes a first pair of aligned arcuate recesses of a first diameter wherein outer edges of the legs includes arcuate recesses of a second smaller diameter to accommodate chucks of varying diametrical configurations. A collet key member is rotatably mounted through the yoke and includes a first and second bevel gear at each end of the collet key with a handle selectively positionable adjacent each bevel gear to effect rotation of each bevel gear relative to an associated chuck or collet member.

9 Claims, 4 Drawing Sheets

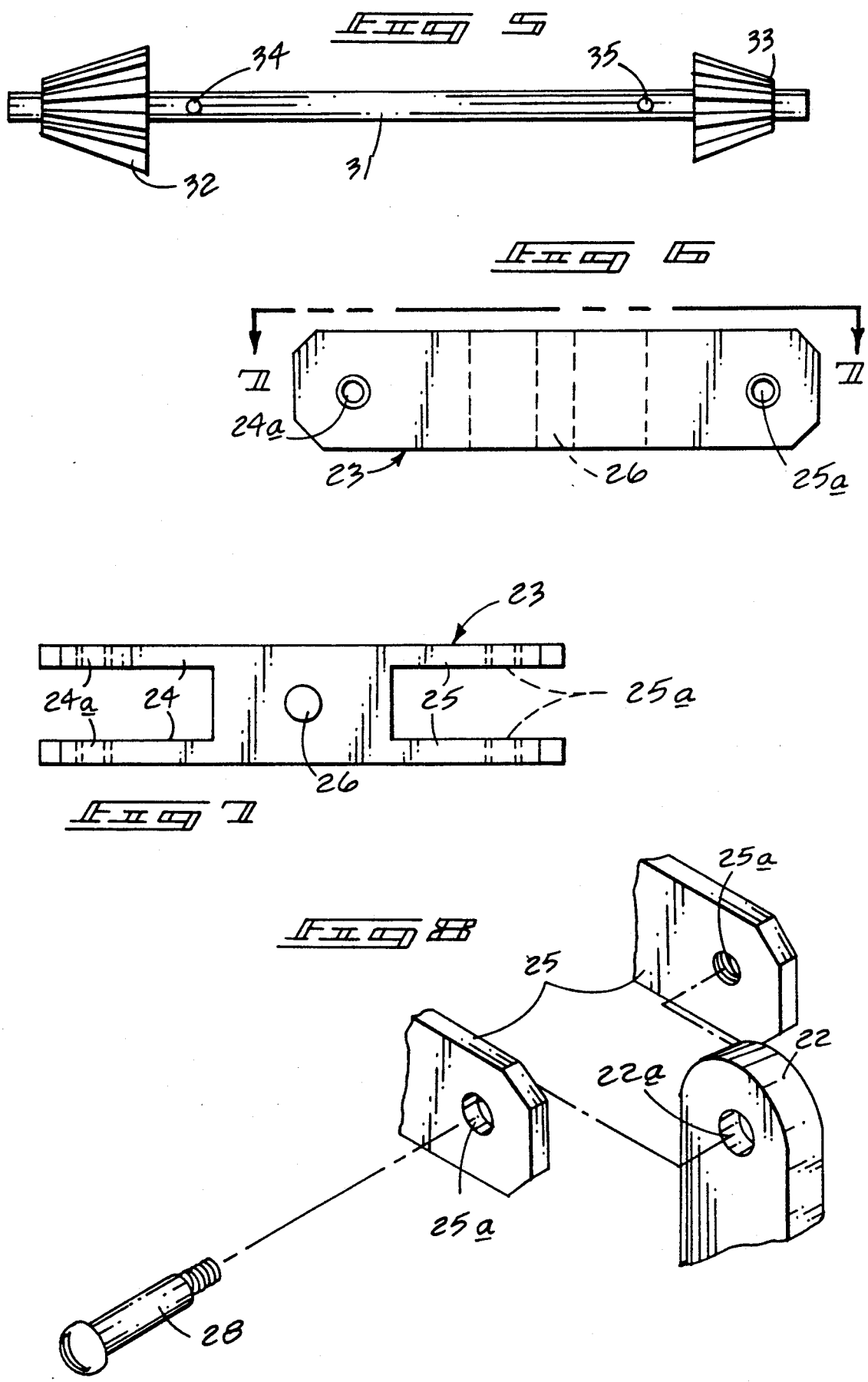

COLLET KEY STABILIZER APPARATUS

BACKGROUND OF THE INVENTION

1. Field of the Invention

The field of the invention relates to collect key structure, and more particularly pertains to a new and improved collect key stabilizer apparatus wherein the same permits accommodation of a plurality of collets of varying sizes.

2. Description of the Prior Art

To insure spanning engagement with a drill chuck, traditionally a single key is inserted within the gear structure of the chuck to effect rotation of the chuck and securement of an associated drill bit and the like. Such arrangements are frequently unsatisfactory to provide adequate alignment and pressure against the collet to insure effective grasping of an associated drill bit and the like. The instant invention attempts to overcome deficiencies of the prior art by setting forth a collet key structure wherein the same provides aligned and secure engagement with an associated collet. Examples of the prior art include U.S. Pat. No. 4,123,195 to PURVIANCE wherein a chuck key holder utilizes pivot legs to secure a collet therewithin for alignment of an associated collet key but is unsuited for securement of a plurality of collet sizes frequently encountered in use by individuals as accordingly of limited applicability in that requirement.

U.S. Pat. No. 2,807,732 to KURTOVICH sets forth a drill with a built in collet key wherein a housing associated with the drill collet aligns an associated collet key in a desired relationship.

U.S. Pat. No. 4,324,512 to SIROKY sets forth a drill with a built in collet key mounted also within a housing portion of the collet structure.

U.S. Pat. No. 2,467,827 to HINTON sets forth a drill truck utilizing a leg member mounted selectively to overly a chuck collet to properly align and position a collet key relative to the drill chuck.

U.S. Pat. No. 3,947,924 to FOX et al sets forth a chuck key member mounted upon a leg wherein the leg is pivotally secured relative to an associated drill and to be swung into position to align the collet key relative to the drill member chuck.

As such, it may be appreciated that there continues to be a need for a new and improved collet key stabilizer apparatus as set forth by the instant invention wherein the same addresses both the problems of ease of use as well as effectiveness in construction in adaptability of the organization to a plurality of chuck sizes and in this respect, the present invention substantially fulfills this need.

SUMMARY OF THE INVENTION

In view of the foregoing disadvantages inherent in the known types of collet key organizations present in the prior art, the present invention provides a new and improved collect key stabilizer apparatus wherein the same permits selective securement of the structure to an associated collet to permit alignment of an associated collet key relative to the chuck structure. As such, the general purpose of the present invention, which will be described subsequently in greater detail, is to provide a new and improved collet key stabilizer apparatus which has all the advantages of the prior art collet key structure and none of the disadvantages.

To attain this, apparatus is provided for surrounding engagement with an associated chuck collet to accommodate a plurality of collet sizes wherein a central H-shaped yoke pivotally mounts a first and second leg downwardly therefrom wherein each leg includes an inner and outer edge where the inner edge includes a first pair of aligned arcuate recesses of a first diameter wherein outer edges of the legs includes arcuate recesses of a second smaller diameter to accommodate chucks of varying diametrical configurations. A collet key member is rotatably mounted through the yoke and includes a first and second bevel gear at each end of the collet key with a handle selectively positionable adjacent each bevel gear to effect rotation of each bevel gear relative to an associated chuck or collet member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved collet key stabilizer apparatus which has all the advantages of the prior art collet key structure and none of the disadvantages.

It is another object of the present invention to provide a new and improved collet key stabilizer apparatus which may be easily and efficiently manufactured and marketed.

It is a further object of the present invention to provide a new and improved collet key stabilizer apparatus which is of a durable and reliable construction.

An even further object of the present invention is to provide a new and improved collet key stabilizer apparatus which is susceptible of a low cost of manufacture with regard to both materials and labor, and which accordingly is then susceptible of low prices of sale to the consuming public, thereby making such collet key stabilizer apparatus economically available to the buying public.

Still yet another object of the present invention is to provide a new and improved collet key stabilizer apparatus which provides in the apparatuses and methods of the prior art some of the advantages thereof, while simultaneously overcoming some of the disadvantages normally associated therewith.

Still another object of the present invention is to provide a new and improved collet key stabilizer apparatus which may be compactly stored when not being utilized.

Yet another object of the present invention is to provide a new and improved collet key stabilizer apparatus wherein the same permits accommodation of a plurality of collet sizes to effect selective securement of various drill bit structures relative thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic view of the collet key shaft and collet bevel gears mounted at each terminal end of the shaft.

FIG. 6 is an orthographic frontal view taken in elevation of the H-shaped yoke utilized by the instant invention.

FIG. 7 is an orthographic top view taken along the lines 7—7 of FIG. 6 in the direction indicated by the arrows.

FIG. 8 is an isometric illustration somewhat exploded of the pivotal association of each leg member relative to the H-shaped yoke.

DESCRIPTION OF THE PREFERRED EMBODIMENT

Figure 1:
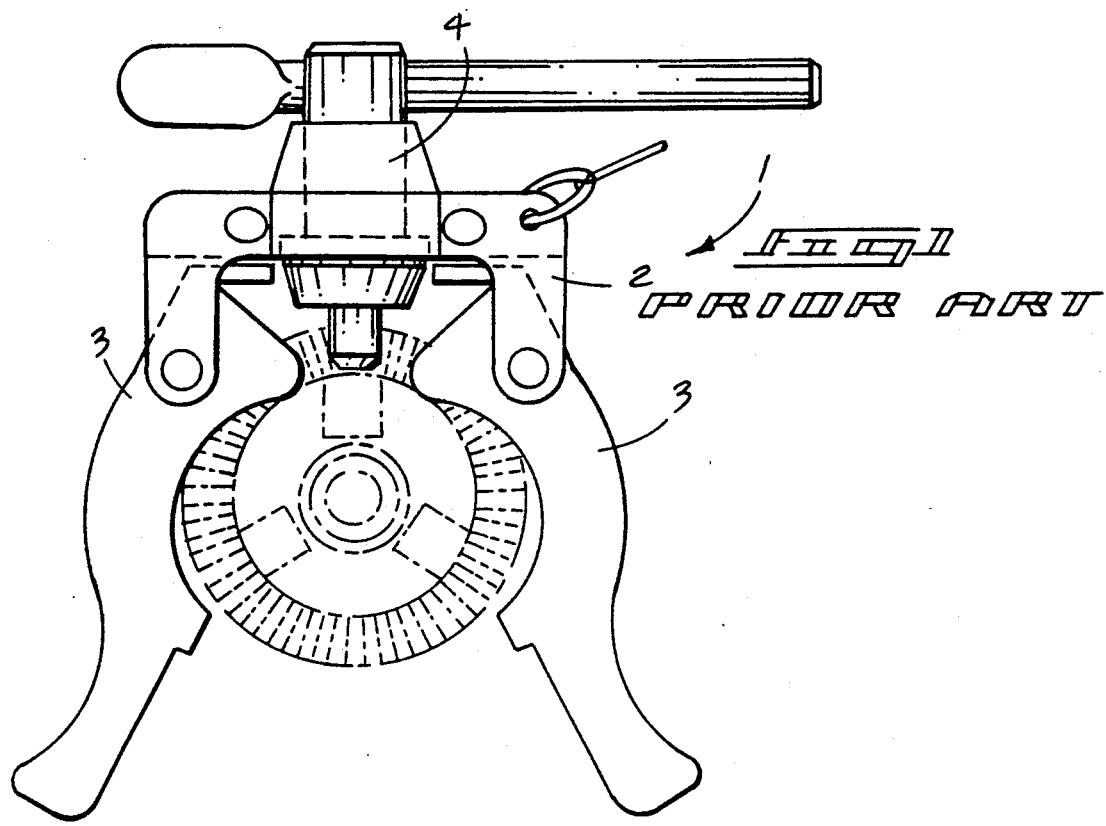
FIG. 1 is an orthographic view taken in elevation of a prior art collet key securement apparatus.
Figure 2:
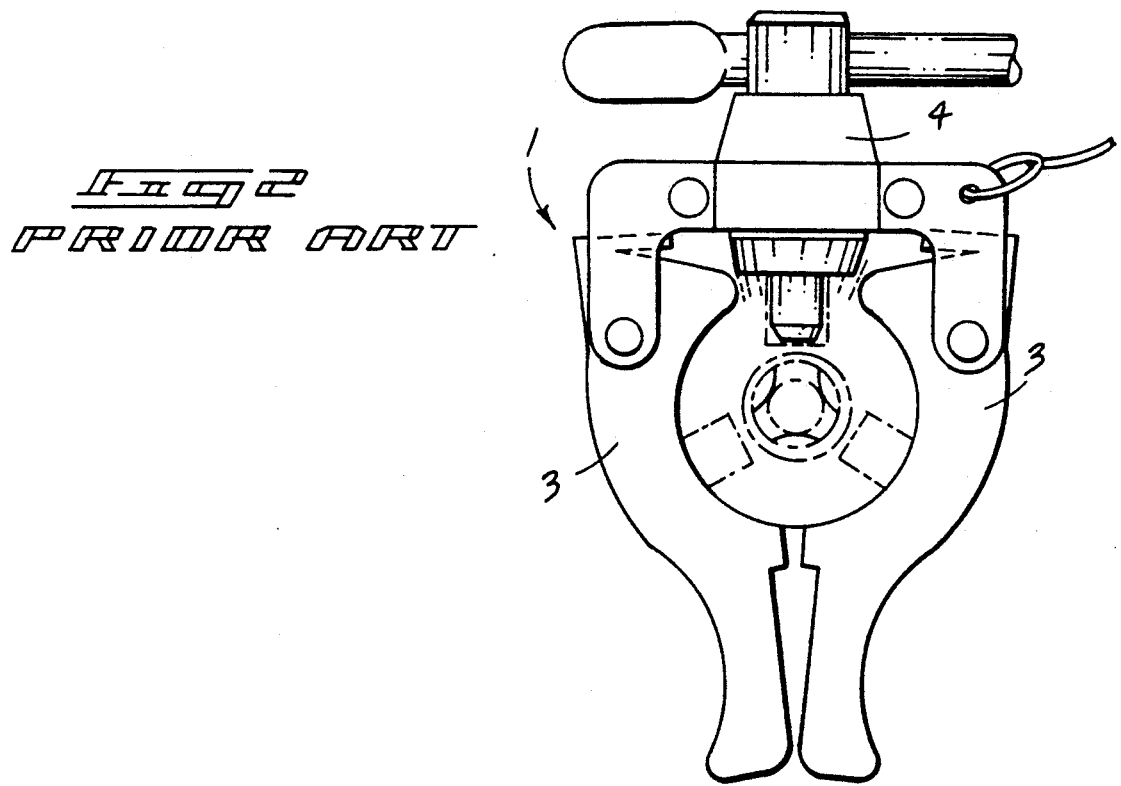
FIG. 2 is an orthographic view taken in elevation of the circuit as illustrated in FIG. 1 in an enclosed relationship relative to an associated collet member.
Figure 3:
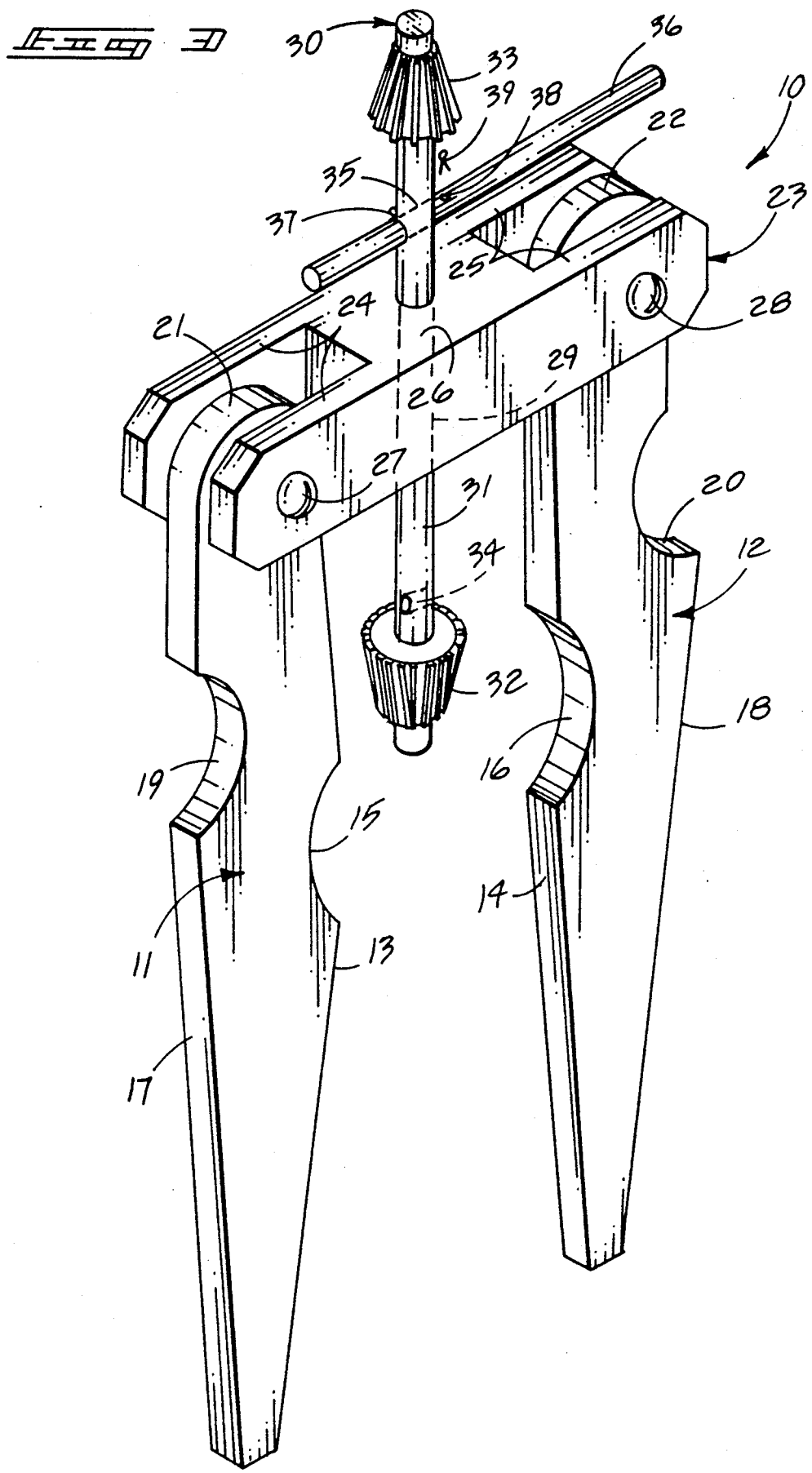
FIG. 3 is an isometric illustration of the instant invention.

With reference now to the drawings, and in particular to FIGS. 1 to 8 thereof, a new and improved collet key stabilizer apparatus embodying the principles and concepts of the present invention and generally designated by the reference numeral 10 will be described.

FIG. 1 illustrates a prior art collet key support structure 1 wherein a central U-shaped yoke 2 mounts a plurality of legs downwardly therefrom to enclose an associated collet member and align a collet key structure 4 therewith for purposes of manipulation of the collet member as illustrated.

Figure 4:
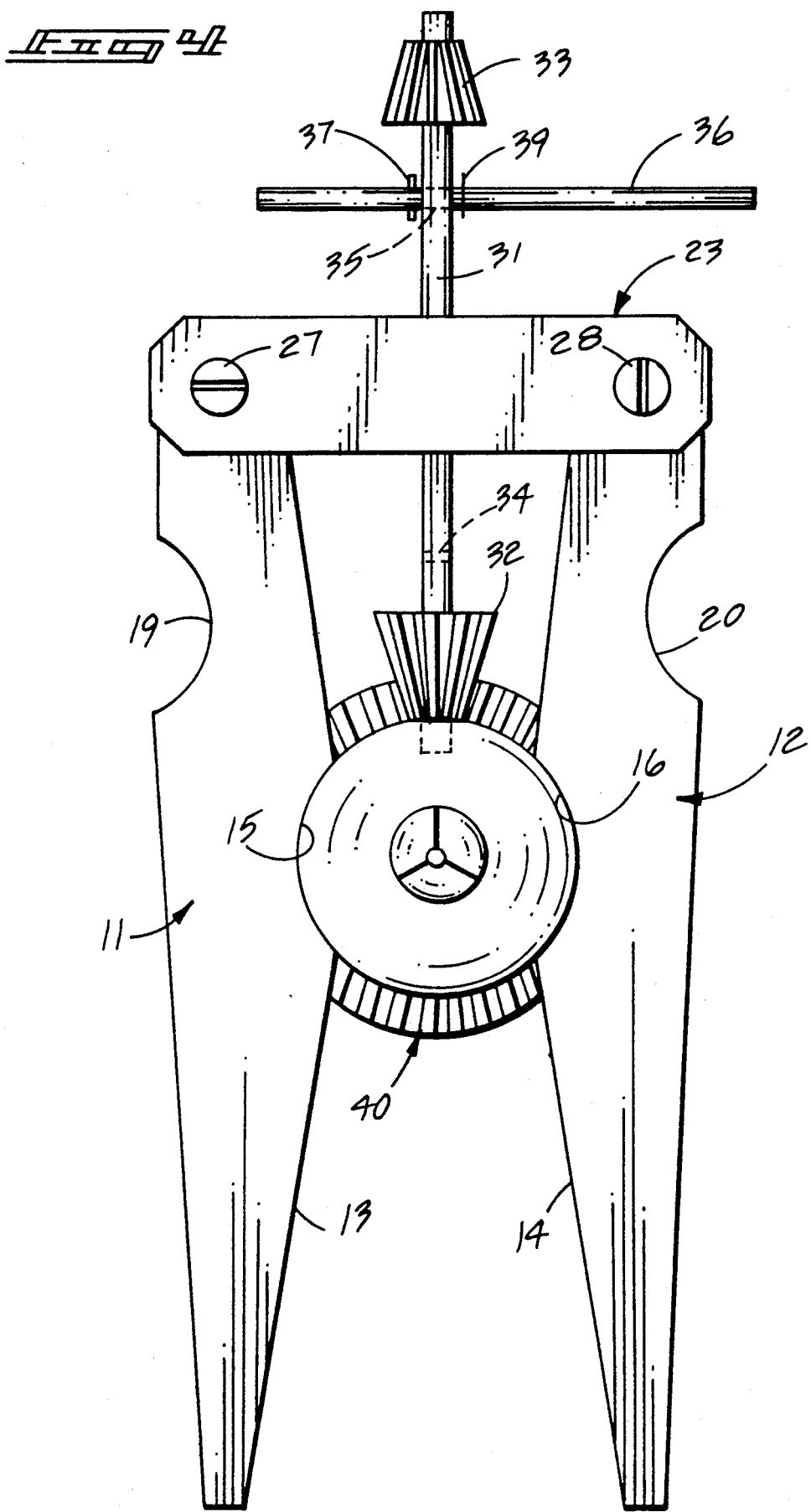
FIG. 4 is an orthographic view taken in elevation of the instant invention in association with a collet member.

More specifically, the collet key stabilizer apparatus 10 of the instand invention essentially comprises a first longitudinally aligned leg 11 and second longitudinally aligned leg 12. The first leg 11 includes a first leg interior surface 13 and a first leg exterior surface 17. The second leg includes a second leg interior surface 14 and a second leg exterior surface 18. The first leg interior surface includes a first leg interior arcuate recess 15 aligned with a second leg interior arcuate recess 16. The interior surfaces of the first and second legs are divergent relative to one another below the first and second arcuate recesses 15 and 16 as well as above the arcuate recesses 15 and 16 as illustrated in FIG. 4 for example as the first and second interior arcuate recesses 15 and 16 are positioned somewhat medially of the interior surfaces 13 and 14 of each respective leg 11 and 12. A first leg exterior surface arcuate recess 19 and a second exterior surface arcuate recess 20 are formed and directed interiorly of the respective first and second leg exterior surfaces 17 and 18 wherein the first and second exterior surface arcuate recesses 19 and 20 respectively are spaced above the first and second leg interior arcuate recesses 15 and 16 adjacent respective first and second pivot axles 27 and 28 that are in turn are directed through the first and second legs 11 and 12 adjacent first and second leg upper terminal ends 21 and 22 respectively as illustrated. The positioning of the respective arcuate recesses 15-16 and 19-20 accommodate variously sized drill chucks or collets 40 as illustrated in FIG. 4 for example wherein a larger drill chuck 40 is positioned between the interior arcuate recesses 15 and 16 wherein a smaller chuck such as a quarter inch size and the like would be positioned to be encompassed by the first and second exterior surface arcuate recesses 19 and 20 by permitting the first and second legs 11 and 12 to be pivoted 180 degrees about their respective first and second pivot axles 27 and 28. Each of the legs includes a pivot bore to receive each respective pivot axle therethrough (see FIG. 8 and the associated second leg pivot bore 22a). The first and second legs are pivotally mounted to an H-shaped yoke 23 that is longitudinally aligned relative to itself to permit pivotment of the first and second legs 180 degrees relative to the H-shaped yoke 23. The yoke 23 includes a first bifurcated leg pair 24 and a second bifurcated leg pair 25. The first bifurcated leg pair 24 includes a first pair of aligned axle bores 24a while the second bifurcated leg pair includes a second pair of axle bores 25a to receive the respective first and second pivot axles 27 and 28 therethrough to pivotally secure the respective first and second legs 11 and 12 relative to the H-shaped yoke 23. A central shank portion 26 of the H-shaped yoke 23 includes a through extending bore 29 directed orthogonally through the central shank 26 to rotatably mount a collet key assembly 30. The collet key assembly 30 includes a alongate cylindrical shaft 31 rotatably received within the bore 29 and includes a first bevel gear 32 adjacent a first terminal end of the cylindrical shaft 31 and a second bevel gear 33 mounted adjacent a second terminal end of the elongate cylindrical shaft 31. The first and second bevel gears 32 and 33 are of varying sizes wherein the second bevel gear 33 is of a reduced diameter to that defined by the first bevel gear 32. It is also noted that the first and second bevel gears 32 and 33 are coaxially aligned relative to the cylindrical shaft 31 and integrally mounted thereto.

Further, the cylindrical shaft 31 includes a first shaft bore 34 directed orthogonally relative to the axis of the shaft 31 adjacent the first bevel gear 32 with a second shaft bore 35 directed orthogonally through the shaft 31 relative to the shaft axis adjacent the second bevel gear 33. The first and second shaft bores 34 and 35 selectively receive a handle 36 therethrough to permit manual rotation of the cylindrical shaft 31 and the associated bevel gears 32 and 33. The handle 36 is directed through the second shaft bore 35 when the first and second legs 11 and 12 are in a first position with the first and second interior arcuate recesses 15 and 16 in confronting relationship wherein the handle 36 is removable from the second shaft bore 35 and positionable within the first shaft bore 34 when the first and second legs are pivoted to a second position with the first and second exterior surface arcuate recesses 19 and 20 in confronting relationship. The handle 36 includes a handle abutment 37 directed orthogonally through the handle 36 and includes a handle bore 38 spaced from the handle abutment 37 a spacing substantially equal to or somewhat greater than a shaft diameter defined by the cylindrical shaft 31 to receive a handle spring clip lock pin 39 therethrough to thereby fixedly secure the handle 36 in a selective manner through either the first or second shaft bore 34 and 35.

It is understood that in this manner, the invention accommodates a plurality of collet sizes within the respective pairs of arcuate recesses 15-16 or 19-20 utilizing the respective first or second bevel gears 32 or 33 with the handle 36 mounted respectively within the second shaft bore 35 or first shaft bore 34.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A collet key stabilizer apparatus comprising in combination, a yoke member, the yoke member including opposed terminal ends, the opposed terminal ends defined by a first bifurcated leg pair and a second bifurcated leg pair, the first bifurcated leg pair including a first leg pivotally mounted therebetween and wherein the second bifurcated leg pair includes a second leg pivotally mounted therebetween, the first leg includes a first interior surface and the second leg includes a second interior surface, the first interior surface includes a first interior surface arcuate recess and the second interior surface includes a second interior arcuate recess wherein the first and second interior arcuate recesses are aligned relative to one another and in confronting relationship when he first and second legs are in a first position with the first and second interior surfaces in confronting relationship relative to one another, and the first and second legs each including a respective first leg exterior surface and a respective second leg exterior surface, and a collet key assembly rotatably mounted through the yoke member to effect rotation of a collet secured between the first leg interior arcuate recess and the second leg interior arcuate recess, and wherein the first leg exterior surface includes a first exterior surface arcuate recess and the second leg exterior surface includes a second exterior arcuate recess, the first and second exterior surface arcuate recesses are in aligned and confronting relationship relative to one another when the first and second exterior surfaces are in a second position with the first and second legs pivoted 180 degrees relative to the first position.

2. Apparatus as set forth in claim 1 wherein the collet key assembly and the elongate cylindrical shaft are rotatably mounted through a bore extending orthogonally and medially of the yoke, the elongate cylindrical shaft including a first bevel gear mounted adjacent a first terminal end of the elongate cylindrical shaft and a second bevel gear mounted adjacent a second terminal end of the elongate shaft wherein the first and second bevel gears are axially aligned with the elongate shaft and fixedly mounted thereto.

3. Apparatus as set forth in claim 2 wherein the yoke member is defined by a longitudinally aligned H-shaped yoke.

4. Apparatus as set forth in claim 3 wherein the elongate shaft includes a first shaft bore orthogonally directed through the cylindrical shaft adjacent the first bevel gear and a second shaft bore orthogonally directed through the cylindrical shaft adjacent the second bevel gear, and a handle selectively receivable through the first shaft bore or the second shaft bore selectively.

5. Apparatus as set forth in claim 4 wherein the handle includes a handle abutment orthogonally projecting relative to the handle and a handle bore spaced from the handle abutment, the handle bore including a handle spring clip lock pin receivable thereto to secure the cylindrical shaft between the handle abutment and the handle spring clip lock pin, the handle abutment spaced from the handle bore a predetermined spacing substantially equal to or greater than a predetermined diameter defined by the elongate cylindrical shaft.

6. Apparatus as set forth in claim 5 wherein the first interior surface and the second interior surface of the first and second leg are divergent relative to one another above and below the respective first and second leg interior arcuate recesses when the first and second legs are in the first position.

7. Apparatus as set forth in claim 6 wherein the first leg is pivotally mounted to the H-shaped yoke between the first bifurcated leg pair adjacent a first leg upper terminal end and wherein the second leg is pivotally mounted to the H-shaped yoke between the second bifurcated leg pair adjacent a second leg upper terminal end, and the first exterior surface arcuate recess is positioned between the first leg interior arcuate recess and the first leg upper terminal end, and the second exterior surface arcuate recess is positioned between the second leg interior arcuate recess and the second leg upper terminal end.

8. Apparatus as set forth in claim 7 including a first pivot axle directed through the first leg adjacent the first leg upper terminal end to pivotally mount the first leg between the first bifurcated leg pair, and a second pivot axle directed through the second leg adjacent the second leg upper terminal end to pivotally mount the second leg between the second bifurcated leg pair.

9. Apparatus as set forth in claim 8 wherein the first bevel gear is defined by a first size and the second bevel gear is defined by a second size wherein the first size is greater than that of the second size.

* * * * *